(12) United States Patent
Eudaly

(10) Patent No.: US 12,427,904 B2
(45) Date of Patent: Sep. 30, 2025

(54) TRANSPORT DECK ASSEMBLY FOR A VEHICLE OR TRAILER

(71) Applicant: Scott M. Eudaly, Baldwin City, KS (US)

(72) Inventor: Scott M. Eudaly, Baldwin City, KS (US)

( * ) Notice: Subject to any disclaimer, the term of this patent is extended or adjusted under 35 U.S.C. 154(b) by 402 days.

(21) Appl. No.: 18/168,669

(22) Filed: Feb. 14, 2023

(65) Prior Publication Data

US 2024/0270144 A1  Aug. 15, 2024

(51) Int. Cl.
  *B60P 1/22*  (2006.01)
  *B60P 1/16*  (2006.01)
  *B62D 21/20*  (2006.01)

(52) U.S. Cl.
  CPC .............. *B60P 1/162* (2013.01); *B62D 21/20* (2013.01)

(58) Field of Classification Search
  CPC ........... B60P 1/162; B60P 3/122; B62D 21/20
  See application file for complete search history.

(56) References Cited

U.S. PATENT DOCUMENTS

| | | | |
|---|---|---|---|
| 1,705,968 A * | 3/1929 | Eisenhut | B60P 1/12 298/17.5 |
| 3,454,175 A * | 7/1969 | Kellaway | B60P 1/6454 414/478 |
| 4,015,879 A * | 4/1977 | Shonkwiler | B60P 1/6454 298/14 |
| 5,782,514 A | 7/1998 | Mann | |
| 5,816,765 A * | 10/1998 | Pijanowski | B60P 3/122 414/480 |
| 5,984,614 A * | 11/1999 | Weber | B60P 3/125 414/547 |
| 6,045,316 A | 4/2000 | Dole | |
| 6,461,096 B1 | 10/2002 | Mentele et al. | |
| 6,589,005 B1 | 7/2003 | Hull | |
| 9,573,509 B2 | 2/2017 | Penner | |
| 2004/0105743 A1* | 6/2004 | Franklund | B60P 3/122 414/482 |

* cited by examiner

*Primary Examiner* — Daniel J Colilla

(57) ABSTRACT

A transport deck assembly for a vehicle or trailer that becomes a ramp for loading and unloading. The deck moves rearward while the rear portion of the deck simultaneously tilts toward the ground, creating a ramp. The deck can then return to a transport position. The transport deck assembly includes a transport deck, a base frame, a transport deck support, a linkage, and a hydraulic cylinder.

8 Claims, 8 Drawing Sheets

FRONT ←

TRANSPORT DECK ASSEMBLY FOR A VEHICLE OR TRAILER

BACKGROUND

1. Technical Field

The present disclosure relates to trailers and vehicles with moveable and tiltable beds or decks that facilitate loading and unloading of vehicles and cargo.

2. Description of the Related Art

Tilt bed trailers have been known for many years. Most fall within two categories: smaller utility trailers of ten ton capacity and under or heavy equipment trailers of 35 ton capacity and over. Trucks with tilting rollback beds are commonly used for vehicle recovery.

The smaller trailers are typically of the drop-axle, deck-between-the-tires style that has a tilt-only function. When the deck is in transport position it is about 12 inches above the ground surface. Tilting the deck about its axle until the rear portion of the deck touches the ground creates a loading ramp. This is suitable for wheeled vehicles, but not for cargo. Cargo is often loaded and unloaded with a forklift and this cargo is placed above the trailer axles for proper weight distribution. With this type of trailer the prime load-carrying portion of the trailer is above the axles but the tires and fenders block forklift access to this portion of the trailer.

The heavy equipment trailers are typically of the deck-over-the-tires style and have a mechanism to move the deck rearward and a separate mechanism to tilt the rear portion of the deck downward to ground level, creating a loading ramp. Another common style allows the axles to travel forward and then the rear portion of the deck tilts downward to ground level, creating a loading ramp. These trailers are useful for both wheeled vehicles and cargo, but these trailers are heavy due to the separate move and tilt mechanisms and the structures required to support them. Scaling-down one of these heavy trailers into a smaller utility trailer is possible, but because of the needed additional mechanisms and structures the resulting smaller utility trailer would be very heavy relative to its carrying capacity.

A rollback truck bed generally has a base frame for tilting and a deck frame that can move rearward creating a loading ramp. These frames, along with the tilting mechanism, are mounted to the truck's frame. While useful to the vehicle recovery industry, it is heavy relative to its carrying capacity.

SUMMARY

This transport deck assembly includes a transport deck, a base frame that could be a vehicle chassis or trailer frame, transport deck supports at the rear of the base frame that allow the transport deck to move forward and rearward and rotate relative to the base frame, a linkage connecting the base frame to the front of the transport deck and one or more hydraulic cylinders that cause the linkage to pivot.

The motion of the transport deck will follow a path as defined by the fixed pivot points of the linkage. This motion is induced by working forces produced by a hydraulic cylinder(s) acting between either the base frame and the transport deck or the base frame and the linkage.

Functionally, to move the transport deck into a loading position the working forces cause the front of the linkage to pivot in a direction that causes the front of the transport deck to rise and move rearward. The transport deck is supported at the front by the linkage and at the rear of the base frame by the transport deck support. The transport deck support acts as a fulcrum such that when the front of the transport deck rises the rear of the transport deck lowers. The transport deck support also allows the transport deck to move rearward as the linkage continues to pivot. The linkage continues to pivot until the rear edge of the transport deck contacts the ground creating a loading ramp. This simultaneous tilting and travelling of the transport deck may result in a lower loading angle than a tilt-only transport deck. Appling forces that cause the linkage to pivot in the opposite direction will cause the transport deck to return to the transport position.

DESCRIPTION OF THE EMBODIMENTS

Figure 1:
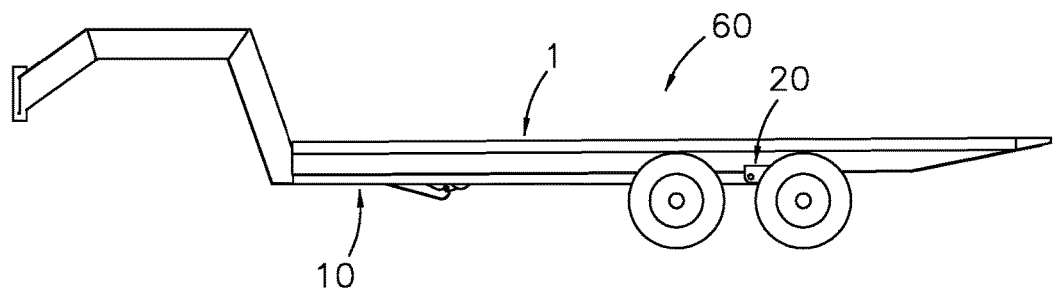
FIG. 1 is a side elevational view of the trailer version in transporting position.
Figure 2:
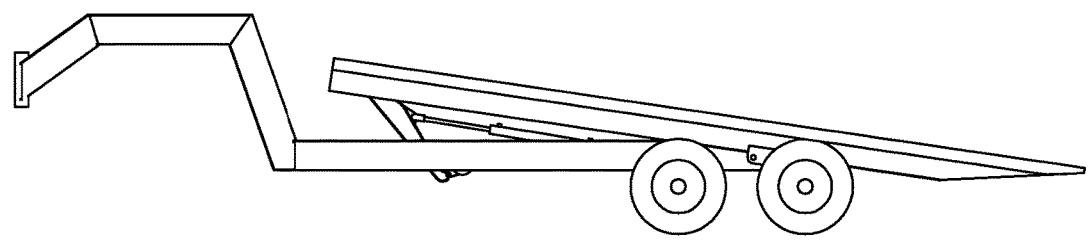
FIG. 2 is a side elevational view of the trailer version in transitioning position.
Figure 3:
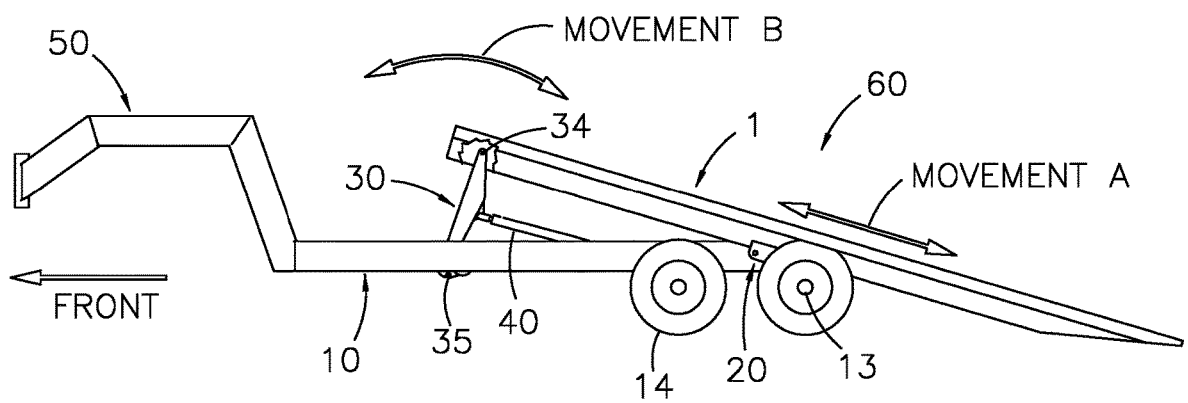
FIG. 3 is a side elevational view of the trailer version in loading position.
Figure 4:
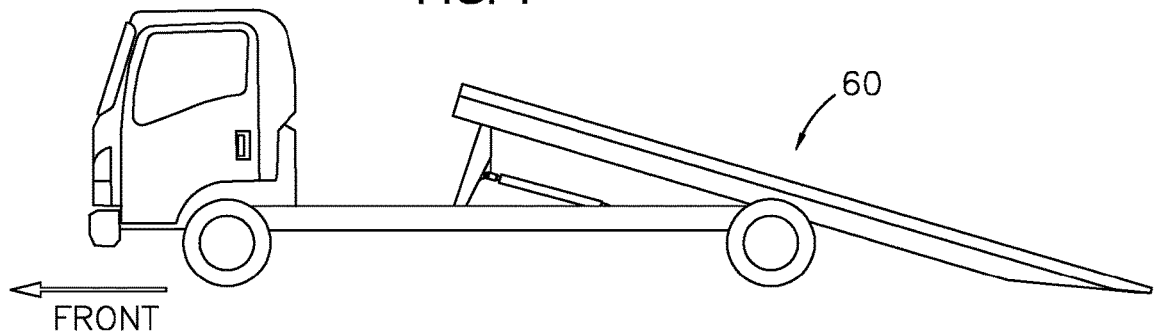
FIG. 4 is a side elevational view of the truck version in loading position.

As shown in FIG. 3, the transport deck assembly 60, shown in trailer configuration, includes a transport deck 1, a base frame 10, transport deck supports 20, a linkage 30, hydraulic cylinders 40 and optionally axles 13, tires 14, and neck 50. FIG. 1 shows the trailer in transport position, where transport deck 1 rests on base frame 10 and transport deck support 20. As shown in FIGS. 2 and 3, when hydraulic cylinders 40 retract, linkage 30 rotates about pins 35 causing the front of transport deck 1 to rise and travel rearwards on transport deck supports 20. Once transport deck 1 is lifted from base frame 10, said transport deck 1 is now supported by linkage pins 34 and transport deck supports 20. As the front of transport deck 1 rises, the rear of transport deck 1 lowers, pivoting about pin 23, FIG. 9. This tilting and rearward motion of transport deck 1 continues until the rearmost edge of transport deck 1 contacts the ground surface, creating a loading ramp, the trailer is now in loading position as shown in FIG. 3. Conversely, when hydraulic cylinders 40 are extended, transport deck 1 moves forward while tilting back toward the transport position, coming to rest onto base frame 10, the trailer is now again in transport position, FIG. 1.

Figure 5:
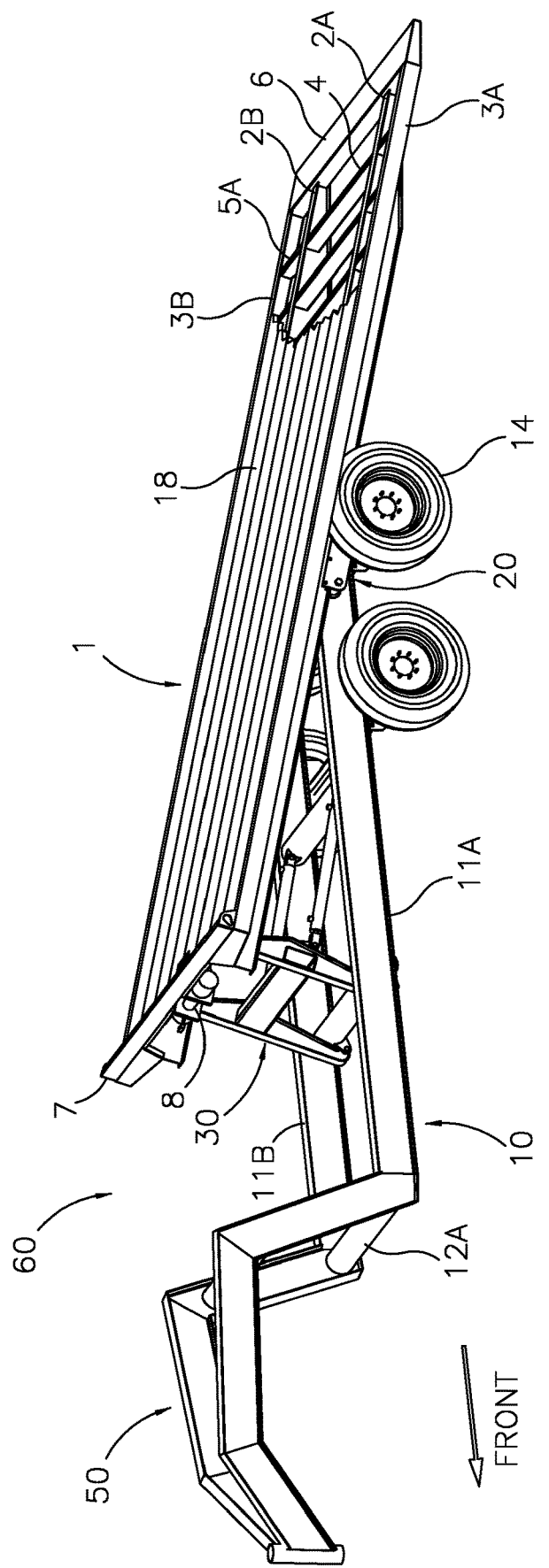
FIG. 5 is an isometric view of the trailer in loading position with a portion of the transport deck broken away to show the supporting structure as viewed from the front upper left.
Figure 6:
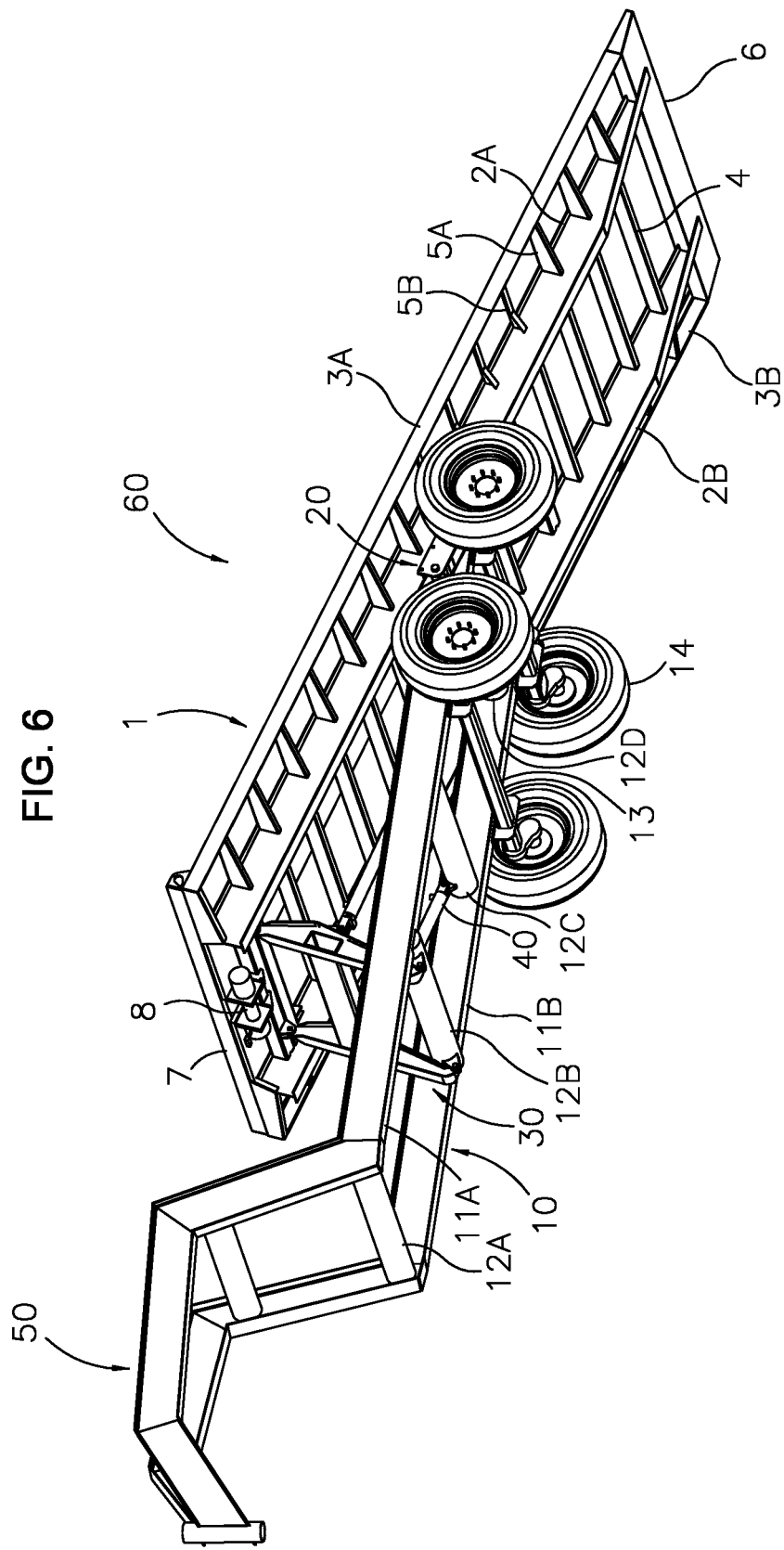
FIG. 6 is an isometric view of the trailer in loading position as viewed from the front lower left.

Referring to FIGS. 5 and 6, transport deck 1 is composed of I-beams 2A and 2B that are parallel to one another. Side rails 3a and 3b are located outward of and parallel to I-beams 2A and 2B. Front channel 7 is attached perpendicularly to the front ends of I-beams 2a and 2b and front ends of side rails 3A and 3B. Tail section 6 is attached perpendicularly to rear ends of I-beams 2A and 2B and rear ends of side rails 3A and 3B. As one skilled in the art will appreciate, there are several crossmembers 4 parallel to front channel 7 and extending from I-beam 2A to I-beam 2B. As one skilled in the art will further appreciate, there are several side crossmembers 5A colinear to crossmembers 4 extending from I-beam 2A to side rail 3A, and, similarly, there are several side crossmembers 5A colinear to crossmembers 4 extending from I-beam 2B to side rail 3B. Side crossmembers 5B have a reduced depth, adding clearance between top of tire 14 and bottom of side crossmember 5B. The transport deck has a rigid surface 18 attached to crossmembers 4, 5A, and 5B. Said surface 18 can be of wood or metal.

Referring again to FIGS. 5 and 6, base frame 10 is composed of I-beams 11A and 11B that are parallel both to one another and I-beams 2A and 2B. Crossmember tubes 12A. 12B. 12C, and 12D extend perpendicularly from I-beam 11A to I-beam 11B. Said crossmember 12 tubes are of sufficient diameter to add torsional stiffness to base frame 10. At the rear of I-beams 11A and 11B are fixed tubes 15 (see FIG. 8) that receive pins 23 (see FIG. 9), creating a pivot point for the transport deck supports 20. As one skilled in the art will appreciate, neck 50 has its rear ends attached to the front ends of I-beams 11A and 11B. As one skilled in the art will further appreciate, the front end of neck 50 will comprise a trailer connecting mechanism suitable for attachment to a towing vehicle. The transport deck assembly 60 shown here is of the gooseneck trailer style, though said transport deck assembly 60 could comprise other common methods for attaching to a towing vehicle.

Figure 7:
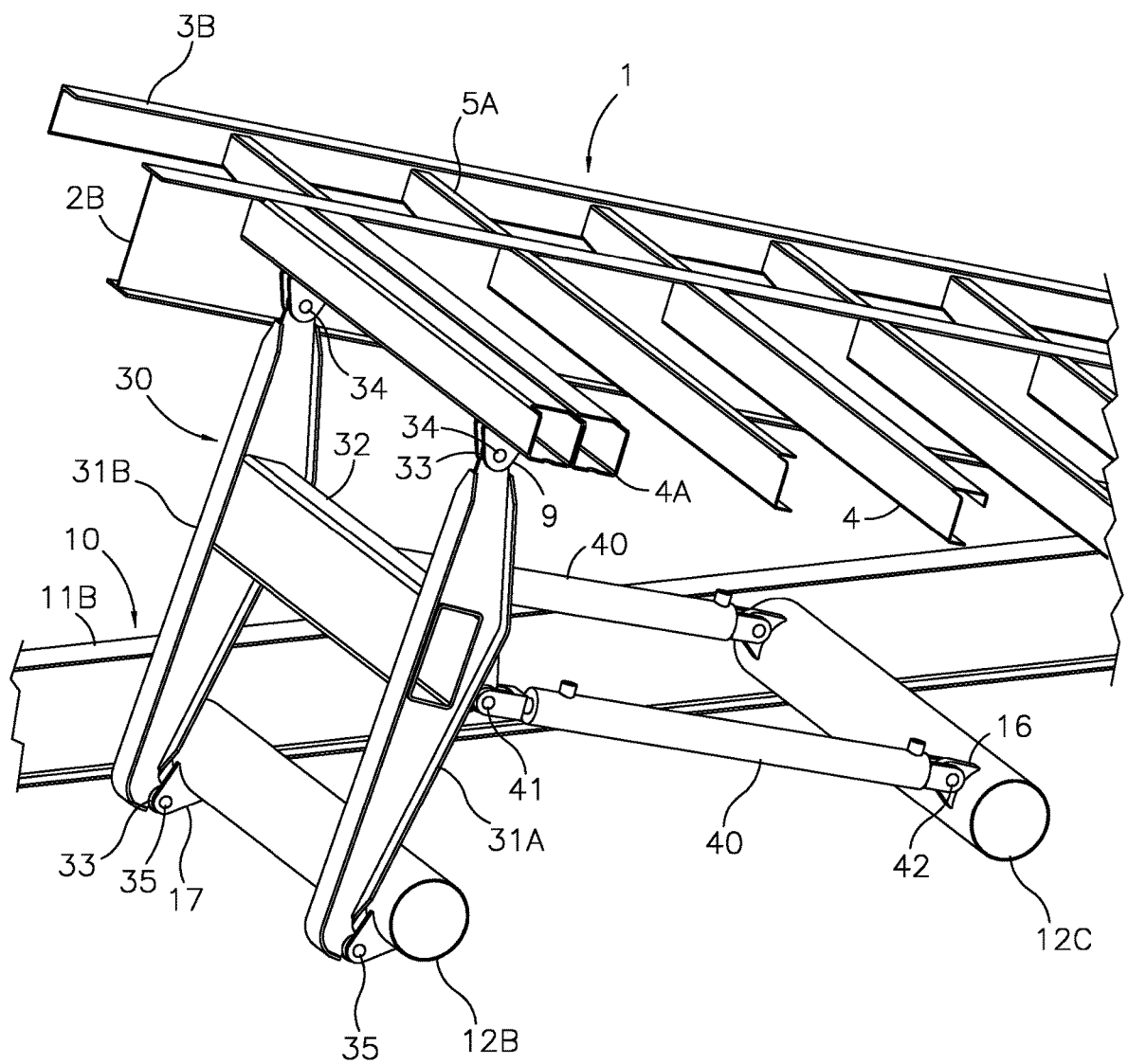
FIG. 7 is an isometric partial view of some working elements of the trailer in loading position as viewed form the front upper left, with many components removed for clarity.

Referring now to FIG. 7, linkage 30 is composed of parallel I-beam arms 31A and 31B connected perpendicularly by a crossmember tube 32 creating a "H" shaped structure. Each arm 31A and 31B are I-beam shaped with a taller cross-section at their middle where crossmember tube 32 attaches and a cross-section that decreases toward each end, creating a taper. At each end of arms 31A and 31B are swivel ball sockets 33, four in total, that allow a pinned connection to transport deck 1 and base frame 10. As an alternative to the single "H" shaped structure, the crossmember tube 32 could be omitted allowing arms 31A and 31B to act as independent structures.

Figure 8:
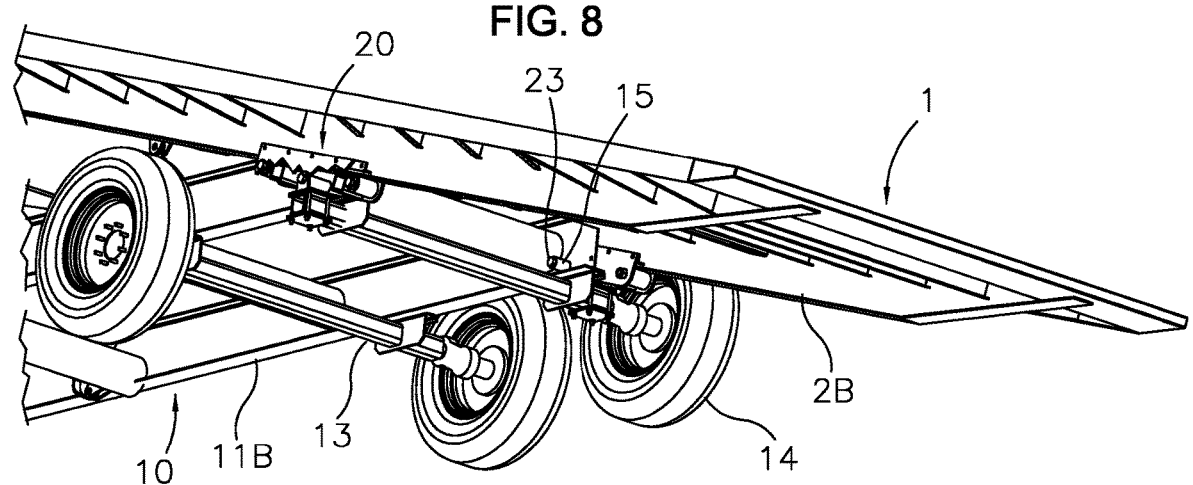
FIG. 8 is an isometric partial view of the trailer in loading position as viewed from the rear lower left, with some components removed for clarity.
Figure 9:
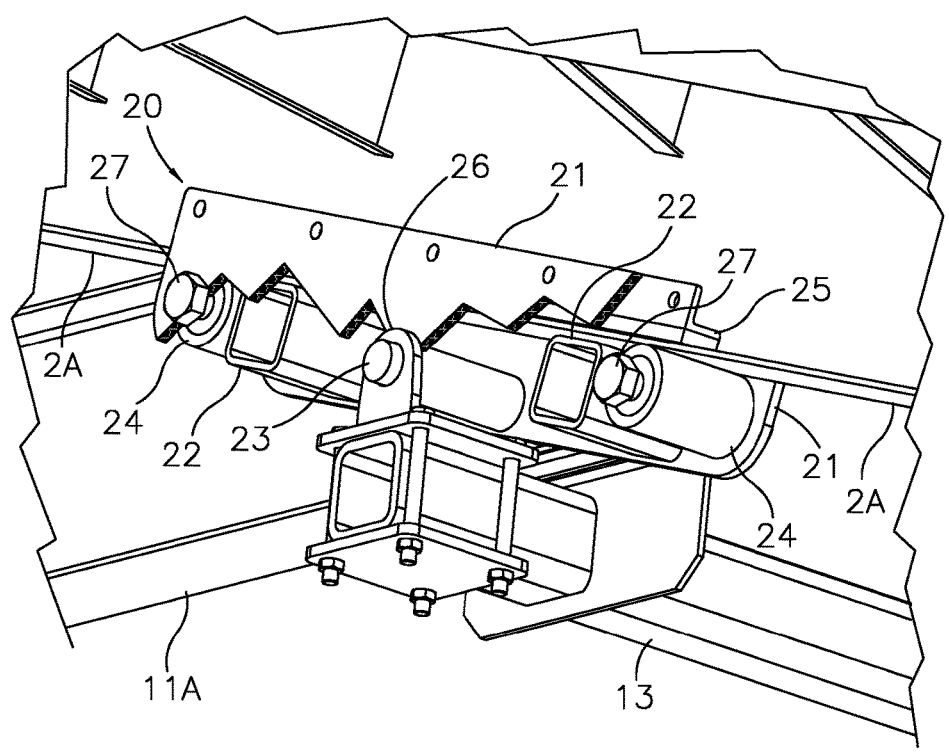
FIG. 9 is an isometric close-up partial view from FIG. 8 specifically of the transport deck support with item 21 broken away for further clarity. The tire, wheel, and a portion of the axle have been omitted.

Referring now to FIGS. 8 and 9, transport deck supports 20 are each composed of two parallel sides 21 (shown as cut away) separated by and fixed perpendicularly to connecting tubes 22. Retainers 25 are attached to the insides of sides 21 and above connecting tubes 22. On each transport deck support 20 are three sets of concentric holes through sides 21 that receive pins. Mounted on pins 27 at the far front and rear of sides 21 are rollers 24, four in total. Pins 23, in the middle of sides 21, attach said transport deck supports 20 rotatably to tubes 15 of the base frame 10. Functionally, the bottom surface of I-beams 2A and 2B of the transport deck 1 will rest upon the upper surface of rollers 24 and between transport deck support sides 21. As one skilled in the art will appreciate, transport deck 1 can travel axially, relative to base frame 10, along rollers 24 while tilting rotatably on pin 23. Said transport deck 1 being constrained from separation from base frame 10 by sides 21 in the lateral direction, rollers 24 in the vertical downward direction and by retainers 25 in the vertical upward direction.

As an alternative to the two independent transport deck supports 20, they could be fabricated as single component, rotating in unison.

Figure 10:
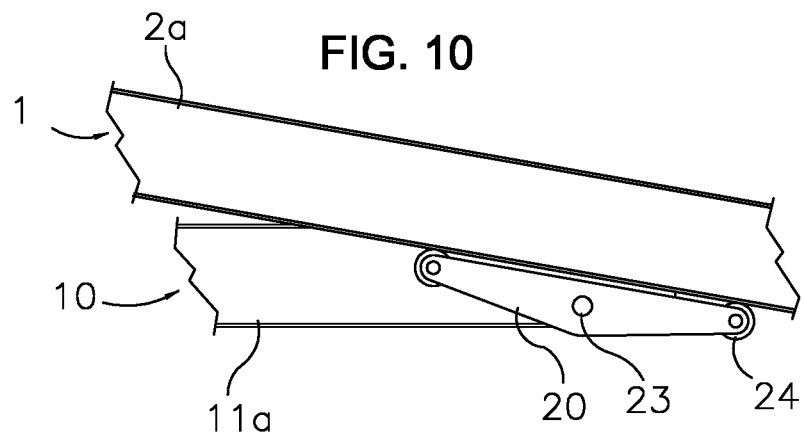
FIG. 10 is an elevational view of a pivoting two-roller version of the transport deck support, shown with the transport deck in the loading position.
Figure 11:
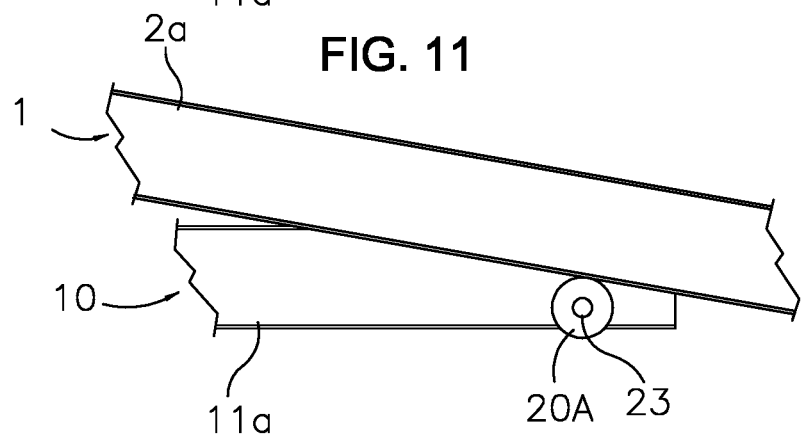
FIG. 11 is an elevational view of a single roller version of the transport deck support, shown with the transport deck in the loading position.
Figure 12:
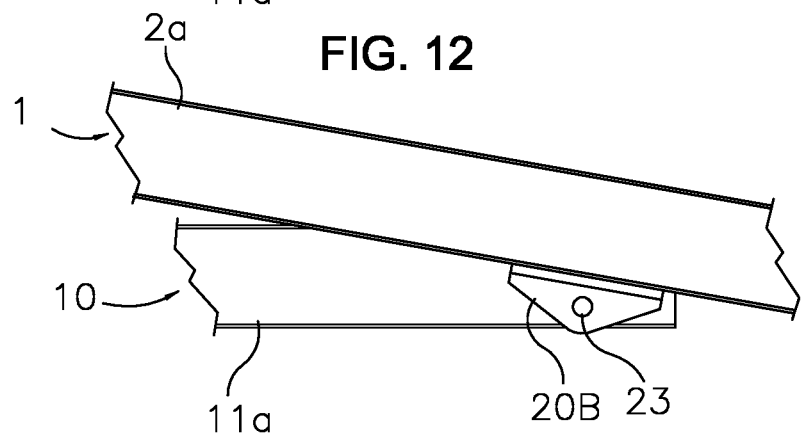
FIG. 12 is an elevational view of a pivoting slidable surface version of the transport deck support, shown with the transport deck in the loading position.
Figure 13:
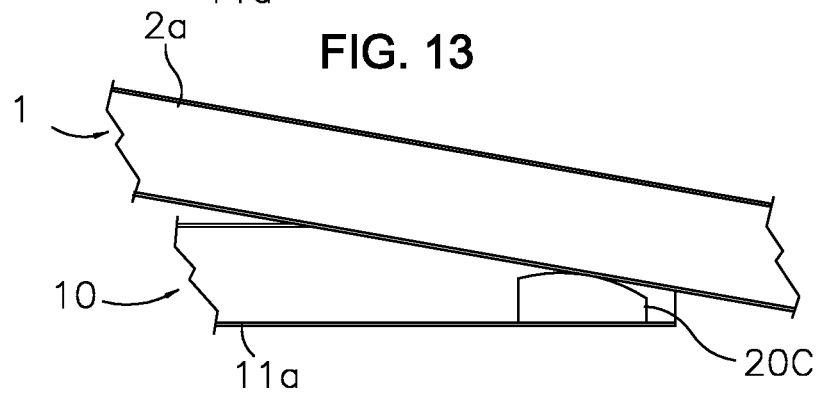
FIG. 13 is an elevational view of a fixed version of the transport deck support, shown with the transport deck in the loading position.

In addition to the two-roller transport deck support 20 previously described and represented again in FIG. 10, there are alternative transport deck supports. FIG. 11 shows a single roller version, 20A. FIG. 12 shows a slidable low-friction surface version, 20B. FIG. 13 shows an immovably fixed version. 20C, that provides both a slidable low-friction surface and a surface that the transport deck 1 can pivot rotatably.

Referring back to FIG. 7 with particular interest in hydraulic cylinders 40. As one skilled in the art will appreciate, these are conventional double-acting hydraulic cylinders. The barrel components of hydraulic cylinders 40 are attached rotatably to lugs 16 on crossmember 12C of base frame 10 with pins 42. The rod ends of hydraulic cylinders 40 are attached rotatably near the middle of arms 31A and 31B of linkage 30 with pins 41. Note that the lower ends of arms 31A and 31B of linkage 30 are attached rotatably to lugs 17 on crossmember 12B of base frame 10 with pins 35 and upper ends of said arms 31A and 31B of linkage 30 are attached rotatably to lugs 9 on the underside of crossmember 4A of transport deck 1 with pins 34. Further, as one skilled in the art will appreciate, when hydraulic cylinders 40 begin to retract, linkage 30 will rotate about pin 35 in a clockwise direction as viewed in FIG. 7, causing transport deck 1 to separate from base frame 10 and said transport deck 1 now has its front end supported on pins 34 of linkage 30 and its rear end supported on transport deck supports 20 (see FIGS. 3, 8, and 9). As hydraulic cylinders 40 continue to retract, linkage 30 continues to pivot clockwise (movement B. FIG. 3) and causes transport deck 1 to tilt and move along transport deck supports 20 (movement A. FIG. 3) until tail section 6 (see FIG. 6) of transport deck 1 makes contact with the surface of the ground creating a loading ramp. At this point, the cargo is pushed, pulled, dragged or driven onto transport deck 1 and secured for transport. Transport deck 1 is returned to a transport position by simply causing hydraulic cylinders 40 to extend, pivoting linkage 30 counterclockwise until transport deck 1 is resting upon base frame 10.

To assist loading and unloading, a winch 8. FIG. 5, is fitted to the front of transport deck 1. This winch 8 could electric, hydraulic or manually operated.

Figure 14:
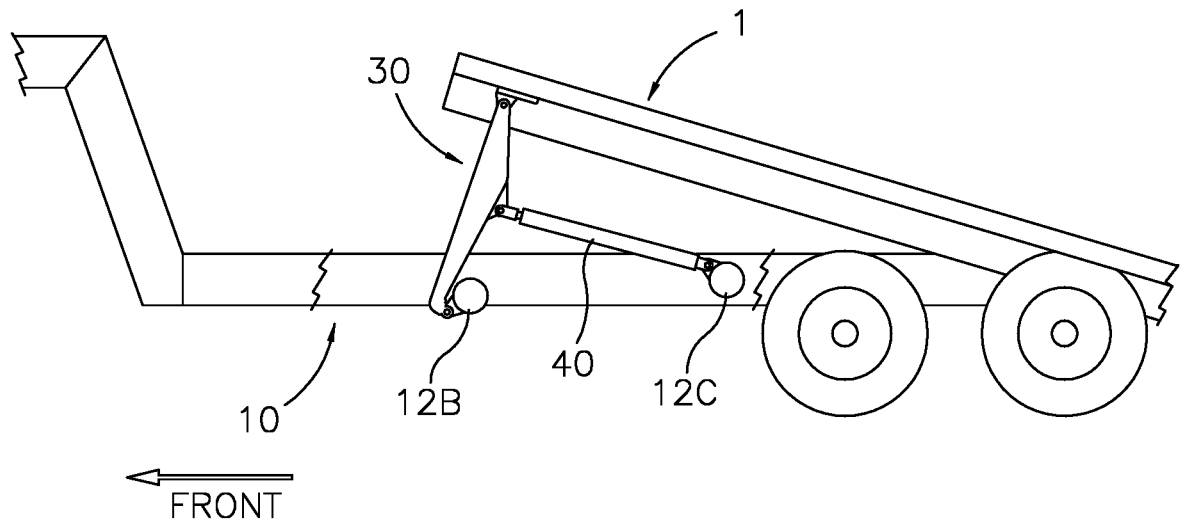
FIG. 14 is an elevational partial view of the trailer with the hydraulic cylinder mounted rearward of the linkage.
Figure 15:
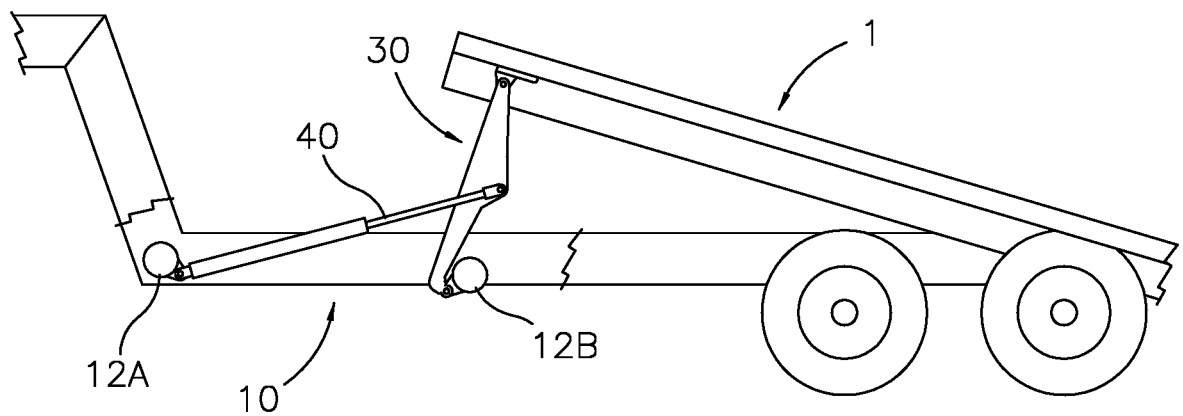
FIG. 15 is an elevational partial view of the trailer with the hydraulic cylinder mounted forward of the linkage.
Figure 16:
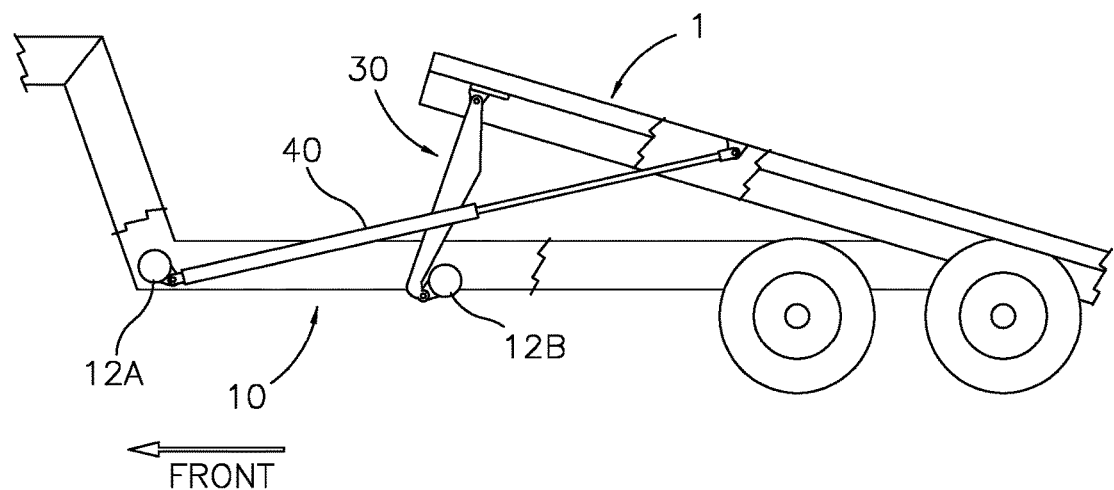
FIG. 16 is an elevational partial view of the trailer with the hydraulic cylinder mounted to the transport deck and the front of the base frame.
Figure 17:
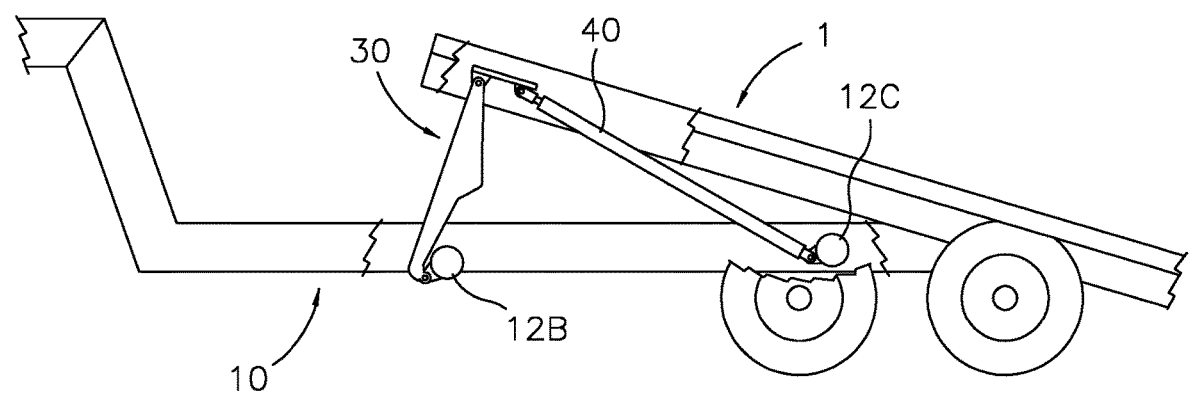
FIG. 17 is an elevational partial view of the trailer with the hydraulic cylinder mounted to the transport deck and the rear of the base frame.

Referring again to hydraulic cylinders 40, it must be noted that there are many other methods of pivoting linkage 30, such as an electric actuator, a winch or even a hand-operated jack. Any of these could be used singularly or in multiples. It is also important to note that any of these devices need not be attached to only base frame 10 and linkage 30 as previously described and shown again in FIG. 14. They could be attached to the front side of linkage 30 as shown in FIG. 15. They could also be attached to base frame 10 and transport deck 1, whereas the hydraulic cylinders 40 extend to move transport deck 1 rearward as shown in FIG. 16. They could also be attached to base frame 10 and transport deck 1, whereas the hydraulic cylinders 40 retract to move transport deck 1 rearward as shown in FIG. 17. It is important to note that the travel path of the deck will be unchanged by the location of said hydraulic cylinders 40, as this travel path is determined by the geometric relationships of pins 23, 34 and 35.

The invention claimed is:

1. A transport deck assembly comprising:
    a transport deck;
    a base frame;
    a transport deck support;
    a linkage; and
    a hydraulic cylinder; wherein
      the transport deck support is attached to the base frame;
      the transport deck is in contact with, but not fixed to, the transport deck support;
      the linkage comprises a first end that is rotatably attached to the base frame and a second end that is rotatably attached to the transport deck;
      the hydraulic cylinder comprises a first end that is rotatably attached to the transport deck and a second end that is rotatably attached to the base frame at an attachment point disposed rearward of the first end of the linkage; and
      the base frame is at least one selected from the group consisting of a trailer and a vehicle chassis.

2. The transport deck assembly of claim 1, wherein the transport deck support comprises two rollers that contact the transport deck.

3. The transport deck assembly of claim 1, wherein the transport deck support comprises a single roller that contacts the transport deck.

4. The transport deck assembly of claim 1, wherein the transport deck support comprises at least one slidable surface that contacts the transport deck.

5. The transport deck assembly of claim 1, wherein the transport deck support is immovably fixed to the base frame.

6. The transport deck assembly of claim 1, wherein
    the deck is configured to reversibly move (movement A) in forward and rearward directions,
    the deck is configured to rotate (movement B) about a horizontal axis that is perpendicular to movement A, and
    movement A and movement B always occur simultaneously with one another.

7. The transport deck assembly of claim 6, wherein movement of the deck in the forward direction advances the deck toward a transporting position.

8. The transport deck assembly of claim 6, wherein movement of the deck in the rearward direction advances the deck toward a loading position.

\* \* \* \* \*